April 6, 1965
J. R. WILCOX ETAL
3,176,636
PLANTER MECHANISM
Filed June 2, 1958
3 Sheets-Sheet 1
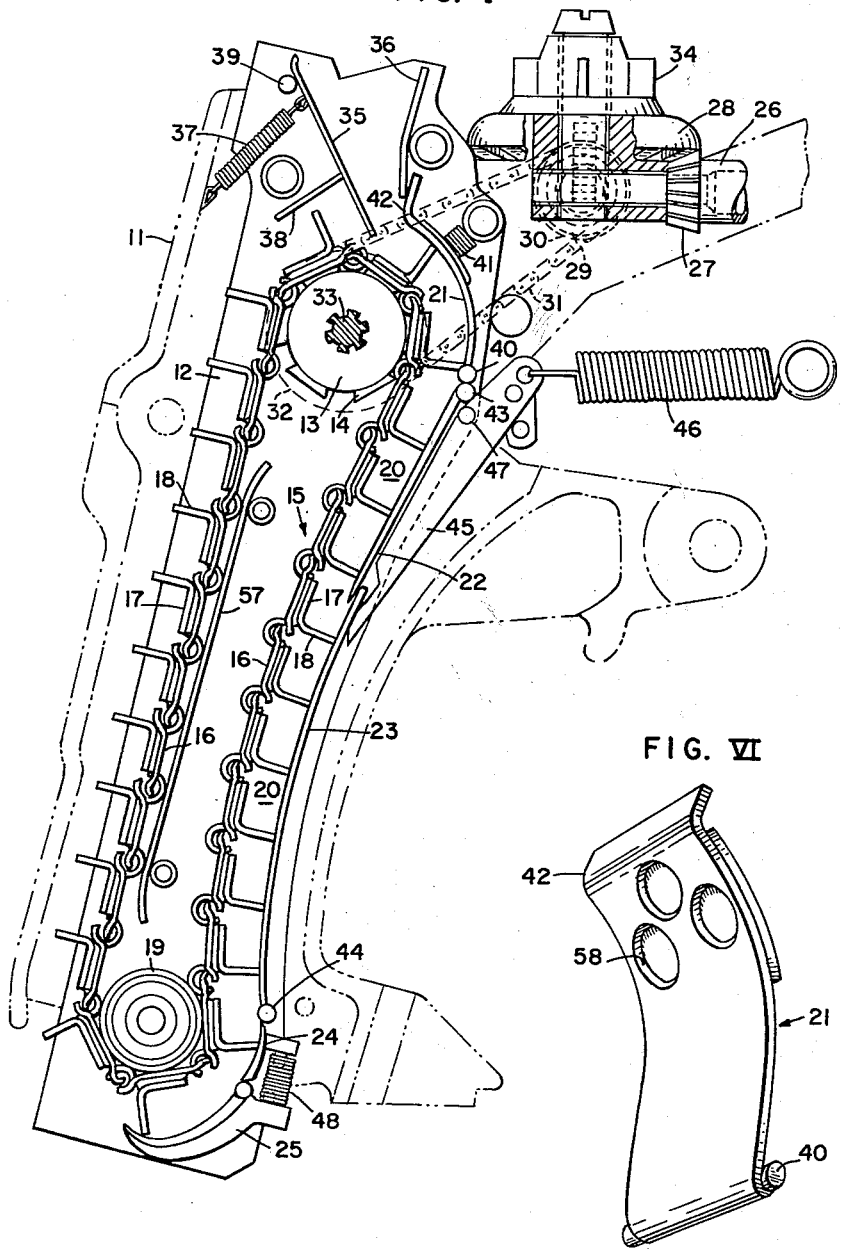
INVENTORS.
JAMES RUSSELL WILCOX
WESLEY D. WILCOX
BY
*Ray Bailey*
ATTORNEY April 6, 1965   J. R. WILCOX ETAL   3,176,636
PLANTER MECHANISM
Filed June 2, 1958   3 Sheets-Sheet 2
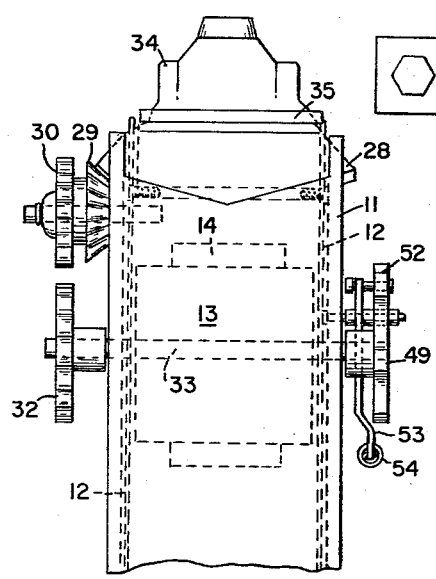
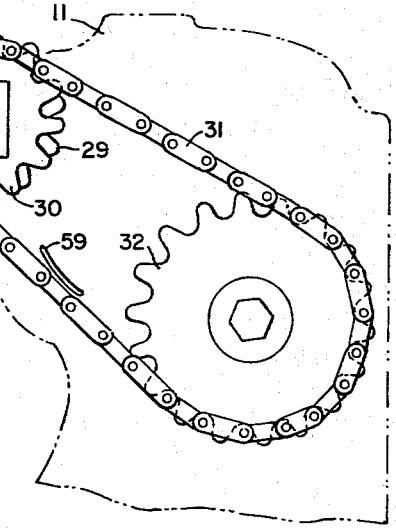
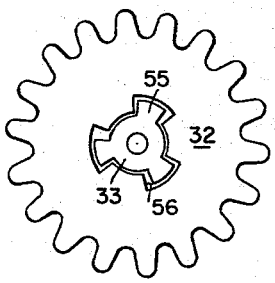
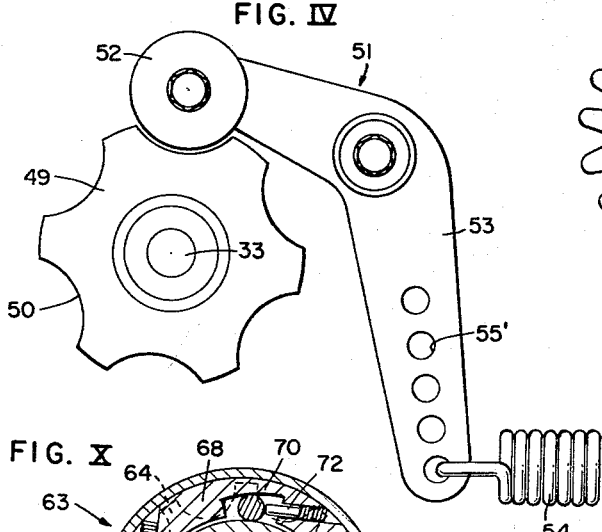
INVENTORS,
JAMES RUSSELL WILCOX
WESLEY D. WILCOX
BY
ATTORNEY April 6, 1965 J. R. WILCOX ETAL 3,176,636
PLANTER MECHANISM
Filed June 2, 1958 3 Sheets-Sheet 3
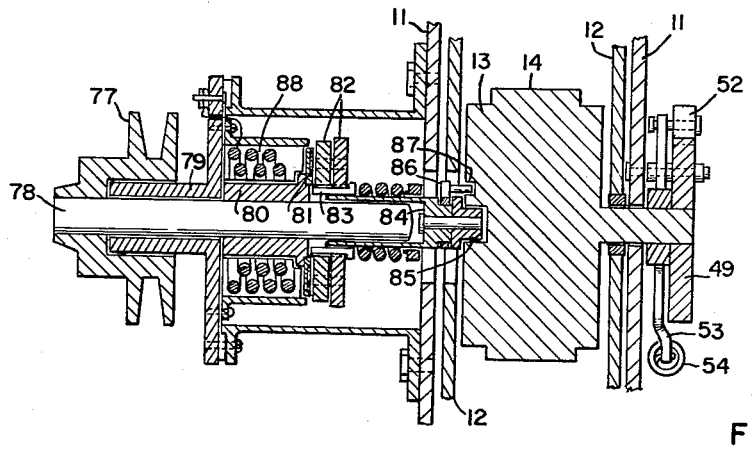
FIG. VIII
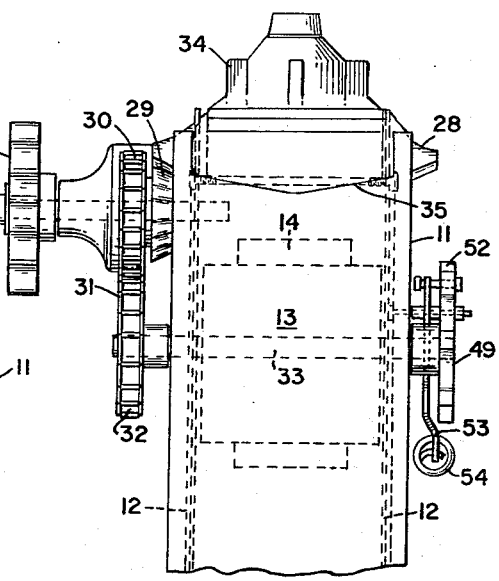
FIG. VII
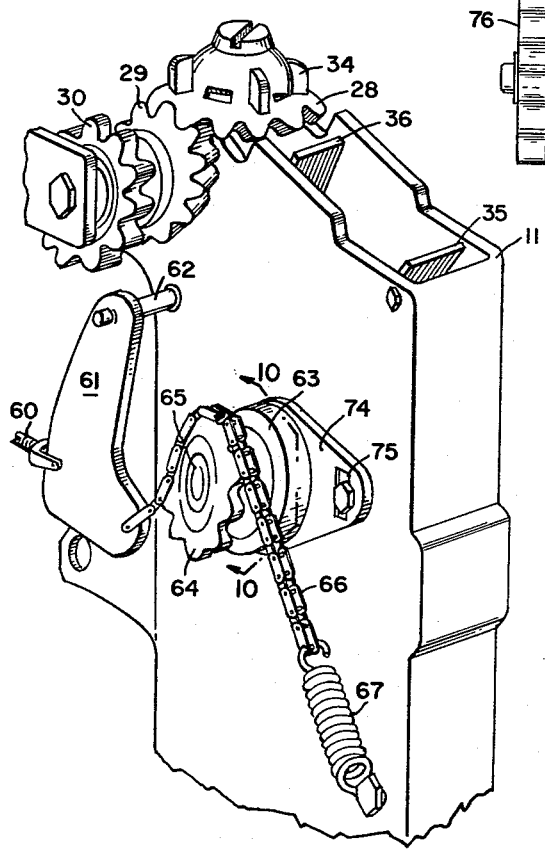
FIG. IX
INVENTORS.
JAMES RUSSELL WILCOX
WESLEY D. WILCOX
BY Ray Bailey
ATTORNEY United States Patent Office 3,176,636
Patented Apr. 6, 1965

3,176,636
PLANTER MECHANISM
James Russell Wilcox and Wesley D. Wilcox, both of Jewell, Iowa, assignors of one-third to Ray V. Bailey, Clarion, Iowa
Filed June 2, 1958, Ser. No. 739,208
9 Claims. (Cl. 111—51)

This invention relates to seed dispensers and at the present appears to have its greatest application in dispensers for corn, soya beans and cotton seed, although it is by no means limited thereto.

In the past it has been the practice to plant corn in hills which were substantially spaced from one another and the speed of travel of the planter has been relatively slow with the result that adequate time was available for a grouping of kernels of seed corn to drop from a planter box to a point adjacent the ground and to then settle together into a group before being lowered to the field, thus insuring a satisfactory hill. On the other hand there was no problem with the timing as far as the planting of soya beans and cotton was concerned because they normally have been planted a single seed at a time at closely spaced locations in the rows. In the case of cotton it has then been necessary to reduce the stand by manually removing many of the tiny cotton plants disposed between those which were to remain.

With the changes in agricultural production practices in the past several years, due in part to improvements in and the availability of fertilizer, it has become desirable to plant corn in hills which are much closer together. It has also become desirable to plant soya beans in hills instead of to drill them and the same is true of cotton, the latter due to the mounting cost of manual labor for removing the surplus plants.

In addition to the evolvement of the desirability of planting definite hills at closely spaced intervals, there has developed the ability to travel across fields at speeds much greater than was possible with power available in former years.

The result has been that the planters now in use have not been highly satisfactory under the changed conditions. When attempts are made to plant with them at increased field speeds, there is a distinct tendency to string the seed out rather than to plant it in hills. Attempts to place hills closer together have simply aggravated the condition. Accordingly, due to the limitations of the planters, it has been necessary to plant at field speeds which are much below those which would be permitted by other factors, a restriction which is particularly unwelcome in view of the current tendency toward larger farms and fields.

A number of structural changes in planters have been suggested by others with view to increasing their permissible field speeds. It is believed that we have invented a process of planting and planting mechanism which are particularly adept at enabling unusually high speed of travel for planters while yet insuring a high degree of accuracy in hilling.

It is one of the objects of this invention to provide a process of planting seed in hills, disposed at relatively close intervals, at a speed substantially faster than that now possible.

Another object of this invention is to provide a process of planting seed wherein a considerable reservoir of seed is maintained at a substantial distance above the ground and a plurality of hill sized groupings of seed are maintained in intermittent downward motion at different levels between the level of said reservoir and the ground.

A further object of this invention is to provide a process for planting seed in which rearward impetus to offset forward movement of the planter is applied to said seed while the same is already in independent motion.

Another object of this invention is to provide planter mechanism adapted to traverse a field at a relatively rapid rate while planting seed in true hills which hills may be as close as only a few inches apart.

Yet a further object of this invention is to provide novel mechanism for lowering individual, hill-sized seed groupings from the planter box to a point adjacent the ground.

Another of our objects is to provide planter mechanism which is adapted to, in an orderly fashion, lower seed from the planter box to the ground and to then give said seed a generally horizontally directed impetus.

A further object of our invention is to provide planter mechanism which is adapted to selectively wire check, power check, and drill seed while yet possessing the ability to accurately plant true hills at close spacings at a relatively rapid field speed.

Another of the objects of this invention is to provide mechanism of the type just described which is capable of being controlled by either mechanical or electrical means.

A still further object is to provide planting mechanisms which may be driven either individually or from a common power source.

Yet another object is to provide a novel mechanism for and a novel process of imparting horizontal impetus to seed.

Other objects of the invention will appear as this disclosure proceeds.

Basically, in its preferred form our invention includes an endless conveyor disposed in the planter boot and extending from near the upper extremity of said boot to near its lower extremity. This conveyor is provided with laterally projecting dividers which, in combination with housing and other structure, provide individual compartments for one or more seed, said compartments being disposed in a generally vertical direction, one above the other. As said conveyor is driven, the said seed are lowered to the bottom end of the boot where they are given a generally horizontally directed impetus at a speed and direction such that, with reference to the ground, the said seed is substantially without horizontal motion. The means which we presently prefer for imparting the said horizontal impetus for certain hilling operations is described in detail herein and includes a conveyor accelerator which resembles a ratchet in appearance.

In order that a clearer understanding of our invention may be had, reference is made to the accompanying drawings which form a part of this specification and in which:

FIGURE I is a side elevation of planter mechanism embodying one form of our invention and in which certain structure has been removed to more clearly reveal the construction and other structure has been broken away for a similar purpose. As a result of the nature of the view certain parts are shown in cross section.

FIGURE II is a fragmentary rear elevation of the mechanism of FIGURE I including certain parts omitted in FIGURE I.

FIGURE III is an enlarged fragmentary elevation of the left side of FIGURE II with certain structure broken away and including a drive chain not shown in FIGURE II.

FIGURE IV is an enlarged fragmentary elevation of the right side of FIGURE II.

FIGURE V is an elevation of a part of the structure shown in FIGURE III with parts omitted to reveal details of construction.

FIGURE VI is a perspective view of a part of the mechanism shown in FIGURE I.

FIGURE VII is a fragmentary rear elevation similar to FIGURE II but disclosing an alternative drive means.

FIGURE VIII is a fragmentary, rear, vertical sectional view of mechanism such as that disclosed in FIGURE I but including electrical means for intermittently applying propulsion.

FIGURE IX is a fragmentary perspective view of mechanism similar to that shown in FIGURE I but adapted to be actuated by a planter wire for check row planting.

FIGURE X is an enlarged cross-sectional view taken on line 10—10 of FIGURE IX.

Referring now to the drawings in greater detail reference character 11 designates a planter boot of the general type well known in the art. Within said planter boot 11 we have installed mounting plates 12 which serve to support much of our novel mechanism. Adjacent the upper end of plates 12 is mounted drive sprocket wheel 13 having truncated sprockets or teeth 14 which serve to propel the chain type conveyor 15. Each link 16 of conveyor 15 has its otherwise open large central area spanned by a floor or plate element 17 and also has a laterally projecting paddle or lip 18. An idler 19 which may optionally be provided with teeth is disposed adjacent the lower end of the boot 11 and the plates 12 for controlling the position and movement of conveyor 15. In the assembly as shown the rotation of sprocket 13 and idler 19 is clockwise in direction and the arrangement of parts is such that individual seed-tight compartments 20 for orderly lowering of seed from the hopper to a point adjacent the ground, are provided on the downward travelling side of conveyor 15 by cooperation of plates 17, portions of links 16, lips 18 and mounting plates 12 together with the elements 21, 22, 23, 24, and 25, the natures and functions of which will be presently described in greater detail.

In the assembly shown in FIGURE I, the drive or power for propelling sprocket 13 is supplied from drive shaft 26 which, through miter gear 27 drives miter gear 28. Gear 28 in turn drives miter gear 29 to which is locked sprocket 30. Drive chain 31 connects sprocket 30 with sprocket 32 which is keyed to shaft 33 to which sprocket 13 is also keyed. In addition to transmitting power from miter gear 27 to miter gear 29, miter gear 28, through its bosses 34, drives the seed plate (not shown) of the planter box (not shown). The arrangement of parts is such that as the said seed plate is propelled by gear 28, seed is dropped into the top of the planter boot between the support plates 12. Deflectors 35 and 36 serve to guide the seed onto the top end of conveyor 15 between the two lips 18 which happen, at the moment, to be at the top. Tension spring 37 serves to return deflector 35 to a position resting against the end of stop 38 after said deflector 35 has been moved angularly upwardly on its pivot 39 by each lip 18 as it passes over drive sprocket 13. Shield 21 pivoted at 40 serves as an additional means for guiding seed kernels into the space between lips 18. Compression spring 41 holds shield 21 against the lower end of deflector 36 and against the outer edge of the adjacent lip 18. In the event that a seed kernel tends to lodge between the upper end of shield 21 and the outer edge of a lip 18, the convex surface 42 of said upper end of shield 21 tends to snub said kernel off from said lip into the space behind it. If the displaced kernel is dragged forward by the outer edge of the lip, compression spring 41 yields enough to permit shield 21 to move on its pivot 40 permitting said kernel to pass between the edge of said lip and shield 21 and on into the compartment just ahead of said lip. Quick return of shield 21 to its normal position, as a result of expansion of spring 41, insures that the unruly kernel is now properly confined in a compartment.

Shield members or guides 22 and 23, in addition to forming part of the closure structure of some compartments 20, also serve to maintain conveyor 15 in a relatively taut condition. As is apparent from FIGURE I they are respectively pivoted at 43 and 44 and are held in contact with the outer ends of lips 18 by lever 45 the lower end of which is held snugly against the upper end portion of shield 23 by means of spring 46 which tends to rotate said lever 45 on its pivot 47. It will be observed that the adjacent ends of members 22 and 23 overlie and are slidably in contact with one another. Shield 24 is a fixed member spanning the space between the lower end of shield 23 and the upper portion of valve 25. It will be observed that the lip engaging surface of valve 25 is partially of a configuration such that lips 18 may pass along it without tending to open said valve. However the free end portion of said valve is provided with a general hook shape enabling its extreme end to be disposed adjacent the main surface of the conveyor and enabling a rapid opening of said valve by a lip 18 when the latter travels along said hooked portion. As will be brought out again later, the hooked shape also provides a restricted space into which the seed kernels are crowded just before their discharge from the planter, thus insuring their deposit as a group in a hill. Compression spring 48 tends to maintain valve 25 in a closed position.

As is apparent from this disclosure and the associated claims, an important feature of our invention is the manner in which the seed is discharged from the planter. In the particular embodiment of our invention which is presently being described, this method of release, when the planter is being used to plant substantially spaced hills, is accomplished by the cooperation of a number of parts. Keyed to that end of shaft 33 which is opposite to the end on which sprocket 32 is located is the element 49 which is in the nature of a disk provided with peripheral notches or cut-outs 50 and which element we shall refer to herein as a notched disk. Adapted to engage the notches of said notched disk 49 is an assembly 51 which resembles a pawl and which includes a rotatable wheel 52, a lever 53 and spring 54, the latter being adapted to hold wheel 52 in intimate contact with the periphery of said notched disk 49. As will be observed by an inspection of FIGURE V, the keying of sprocket 32 to shaft 33 is not of the usual type. The splines 55 of shaft 33 are substantially smaller than the cooperating notches or slots 56 of sprocket 32. As sprocket 32 drives shaft 33 together with sprocket 13 and notched disk 49, pawl wheel 52 is caused to rotate along the periphery of said notched disk 49 in and out of notches 50. Normally, the driving surfaces of notches 56 of the sprocket 32 are in intimate contact with the adjacent cooperating surfaces of splines 55 of shaft 33. However, when wheel 52 is just entering a notch 50, the tension of spring 54 causes it to descend very rapidly into said notch with the result that notched disk 49 and shaft 33 are momentarily driven at a speed substantially greater than that at which they are normally driven by sprocket 32. The enlarged size of notches 56 enable the momentary additional speed and movement of shaft 33 to occur without appreciable tendency to transmit the speed-up to drive chain 31 and other remote parts of the main drive train.

The arrangement of parts is such that the accelerated motion provided by the cooperation of wheel 52 and a notch 50 commences when a lip 18 of conveyor 15 is in the process of opening valve 25 or is about to start to open said valve to discharge a grouping of seed. The particular lip involved, driven by power from sprocket 32 and the main drive train, pushes the seed of the particular grouping into the restricted space adjacent the free, hooked end of valve 25 and just at that approximate juncture is given a rapid and forceful speed-up by the entrance of wheel 52 into a notch 50, causing said lip to open valve 25 very rapidly and to give a corresponding impetus to the seed as it leaves the planter. The direction of the impetus is, of course, opposite to that of the direction of travel of the planter and the speed of said impetus may be regulated by adjustment of the tension of spring 54. A plurality of orifices 55′ are provided in lever 53 to enable adjustment of said tension and adjustment means may also be provided at the opposite end of spring 54. Ideally, the tension setting is such that the speed at which the seed is thrust rearwardly is approximately equal to the forward speed of the planter with the result that said seed alight upon the ground with little, if any, tendency toward horizontal movement and hence without any substantial inclination to roll. A person knows the approximate speed at which he will be travelling and can set the tension of spring 54 accordingly before even starting to plant. A high degree of accuracy in hilling is thus insured.

When drilling and when planting in hills which are very close together the conveyor lips are moving rapidly enough to apply the desired rearward impetus without the use of the assembly of FIGURE IV. Said assembly may accordingly be disconnected under such planting conditions.

Since the planter boot and conveyor are inclined slightly forward at the top with the result that there is a tendency for the upward travelling run of the conveyor to sag slightly between sprocket 13 and idler 19, we have found it expedient to provide a guide member 57 for preventing such sag inasmuch as, if the sag is permitted, the take-up thereof, when wheel 52 enters a notch 50, delays and reduces the rearward impetus given to the seed being discharged.

Shield 21 is shown in detail in FIGURE VI in its preferred form. A certain amount of difficulty was experienced initially with kernels of seed becoming lodged between the lips 18 and shield 21 with the result that some kernels were broken and jamming even occurred a time or two. We have found that by providing one or more indentations 58 in the operative surface of the said shield adjacent its upper end, the lodging and kernel breakage are averted.

In at least one planter available on the market a central drive shaft is provided for indirectly propelling the seed plates of a plurality of planting assemblies or units which central drive shaft is provided with a number of adjustments for regulating its speed and hence the rate at which seed are dispensed from the planter boxes. If the drive shaft 26 of the mechanism of FIGURE I is connected to the central drive shaft of such a planter, a number of variables are provided for regulating the speed at which our planter mechanism will plant and for controlling the number of kernels deposited at each planting or hill and the spacement between said plantings or hills. For example, in addition to the adjustments available on the said main drive shaft, the planter plates may of course, be changed. In addition, further adjustment may be readily procured by interchanging or otherwise varying the sizes of sprockets 30 and 32. A take-up 59 (FIGURE III) for compensating for any slack in chain 31 is provided. Other means of regulation are also available as is apparent from this disclosure.

As a result of the versatility of our invention it can be used either to drill seed at close intervals or to perform the operation commonly referred to as "power checking." By a slight adaptation it may be used for check row planting in which the power for actuating the planting mechanism is provided by a planter wire.

An embodiment of our mechanism adapted to be used for check row planting is illustrated in FIGURES IX and X. A pull rod 60, operatively connected to the planter wire, engages coupler 61 which is pivoted at 62 on boot 11. Also mounted on boot 11 is a power transmitter 63 which is of a type such that its sprocket 64 may be freely rotated in one direction without propelling the main shaft 65 of said power transmitter 63. Rotation of sprocket 64 in the opposite direction propels said main shaft 65. In this embodiment of our invention shaft 65 replaces shaft 33 and serves to actuate conveyor drive sprocket 13. An assembly such as that shown in FIGURE IV is preferably installed on the opposite end of shaft 65 similarly as in other embodiments of our invention. However, in this embodiment said assembly of FIGURE IV serves primarily as a stabilizer or locater of the position of the conveyor between actuations of said conveyor by the planter wire as will presently appear.

Propulsion of the conveyor by the planter wire is procured by means of a drive chain 66 which operatively engages sprocket 64 and which is fastened at one of its ends to coupler 61 and at its other end to spring 67. The arrangement of parts is such that when a knot on the planter wire actuates pull rod 60, sprocket 64 is rotated enough to discharge the seed from one seed compartment of the apparatus shown in FIGURE I. In this check row assembly the normal speed of travel of the conveyor lips when moved by the planter wire is such that the lip ejecting the seed out of valve 25 automatically provides the rearward thrust or impetus desired to cause the seed to alight upon the ground without substantial tendency to horizontal motion. The faster the planter is travelling across the field the faster the ejecting lip is moving. As soon as the planter wire has ceased to actuate pull rod 60, spring 67 returns sprocket 64 and coupler 61 to their original positions without rotating shaft 65 and without moving conveyor 15, said sprocket being rotatable, as previously mentioned, on one direction, without driving said shaft 65.

In FIGURE X we have illustrated the details of the power transmitter 63: sprocket 64 is integrally formed with collar 68 and shaft 65 is keyed to collar 69. Cutouts 70 are provided on the inner face of collar 68, said cut-outs being deeper at one of their ends than at the other. Rollers 71 are provided in said cut-outs and are normally held in snug engagement with the outer periphery of collar 69 and with portions of collar 68 which adjoin said cut-outs by means of detents 72 which hold said rollers 71 in as restricted portions of cut-outs 70 as possible as a result of pressure exerted on said detents by means of springs 73. When, in FIGURE X, sprocket 64 is revolved in a counter-clockwise direction the enlarged portions of cut-outs 70 are tending to move toward the rollers 71 thus releasing pressure on said rollers and permitting them to revolve around the outer periphery of collar 69 without causing said collar to rotate. However, when sprocket 64 is rotated in a clockwise direction the restricted portions of cut-outs 70 tend to travel toward said rollers with the result that said rollers, already held in snug engagement with both collars 68 and 69 by detents 72, immediately lock collar 69 in rotation with collar 68 thus propelling shaft 65. When our mechanism is propelled by a planter wire, miter gear 29 and sprocket 30 are idle.

FIGURE IX also discloses another means for tightening conveyor chain 15. The bearings for shaft 65, or its counterpart, shaft 33, are mounted in plate 74 and a corresponding plate on the other side of the boot and the openings in the boot and in plates 12 through which the shaft, 65 or 33, passes are of substantially larger diameter than is said shaft. Slotted mounting openings 75 in said plates 74 permit adjustment of the positions of said plates and hence of conveyor drive sprocket 13, mounted on shaft 33 or 65, thus enabling the tightening of said conveyor.

The modification shown in FIGURE VII is substantially identical with the mechanism of FIGURES I and II except that the propelling power, instead of being supplied by a drive shaft, is supplied by a chain or belt engaging the sprocket or sheave 76. Gear 28 which propels the seed plates is driven by gear 29 instead of driving said gear as in FIGURE I. This particular embodiment of our invention enables its use as a tractor mounted accessory. Several of our units may be mounted on a tractor and each be individually driven through sprockets 76 by their respective ground wheels which cover the seed. This embodiment of our invention may even be used, in a similar manner, on a cultivator, to convert the latter into a planter. Of course the structure of FIGURE VII may be used in a regular planter and all of the sprockets 76 may be driven from a single line shaft. On the other hand it would also be possible to provide means for individually driving the drive shafts 26 of mechanisms such as that shown in FIGURE I by operatively connecting them to the corresponding ground wheels.

In the form of our invention which is shown in FIGURE VIII, propelling power is applied through sheave 77 which drives shaft 78 journaled in bearing 79. Collar 80 which mounts clutch section 81 is keyed to shaft 78. Cooperating clutch assembly 82 with teeth on its inner periphery, operatively engages gear 83 and is slidable longitudinally thereof. Gear 83 itself is locked to hollowed shaft 84 on the end of which is a pivot 85 adapted to mount the adjacent side of conveyor drive sprocket 13. A crank 86 locked to hollow shaft 84 and engaging a cut-out 87 in sprocket 13 enables said hollow shaft 84 to drive sprocket 13 and hence conveyor 15. A solenoid 88 provides means for selective driving of hollow shaft 84 and the mechanism connected thereto by shaft 78. When solenoid 88 is activated, clutch assembly 82 is pulled into driven engagement with clutch section 81. Upon the electric current in solenoid 88 being cut off, clutch assembly 82 immediately ceases to be driven. A timer (not shown) is provided for activating solenoid 88 at selected intervals and preferably for such a brief period of time as to only discharge one seed grouping from valve 25 during each activation. In this embodiment as in that shown in FIGURE IX, the notched disk and pawl assembly of FIGURE IV serves primarily to hold the conveyor in stationary, predetermined positions between applications of power since the speed at which sheave 77 is driven is such that when shaft 78 is locked in driving relationship to the conveyor 15, lips 18 are traveling rapidly enough to provide the desired rearward impetus to the seed as it is discharged from valve 25. Sheave 77 is normally indirectly propelled by some ground engaging wheel.

While we have used mounting plates 12 in our illustration, we are convinced that it would be more desirable to eliminate them and to mount on the planter boot the parts mounted on said plates. Of course said boot could itself be replaced by other suitable support structure. Similarly, conveyor 15, its mounts, the drive train, the seed and other guides, the compartments, the valve and the other structure may be widely varied and parts may be eliminated. It is not at all essential that the base element for the conveyor be a link chain. In fact a device wholly different than an endless conveyor may be used for lowering the seed from the planter box to a point adjacent the ground.

We think that a modification which we may very well make ourselves is elimination of spring loaded shields 22 and 23 and their attendant structure. These may be replaced by a stationary member against which the edges of lips 18 may slide. Simultaneously, we anticipate so mounting conveyor drive sprocket 13 or idler 19 that there will be a continual tension on the conveyor to minimize any slack due to wear and any tendency to sag. In this connection we are thinking of making the lower section of the boot, together with idler 19 and the valve structure, movable relative the other structure and of placing it under spring tension.

If it is desired to retain the conveyor structure in much its present condition but to provide other means for causing the lips 18 to give accelerated rearward impetus to the seed, such means might take the form of a multiple cam and cam follower, the latter being heavily loaded. Any suitable means may be used which is capable of independently advancing the conveyor for a short distance at a speed faster than that at which it is being driven by the main drive. A brake shoe type arrangement could replace the structure of FIGURE IV when the latter is used as a stabilizer. Any suitable structure or arrangement of parts, for example a pawl and ratchet, may be used to replace that which we have shown for transmitting the drive of a planter wire to the seed control mechanism. Similarly any appropriate means, including a suitable timed hydraulic pressure unit, may replace that shown in FIGURE VIII for intermittently connecting a power source to the seed control mechanism and it may be connected thereto in any suitable way.

In its preferred form our process of planting seed entails moving a reservoir of seed across a field at tractor speed. Said reservoir is preferably elevated somewhat above the level of the field and a plurality of hill-sized groupings of seed are provided between the level of the reservoir and the ground. These groupings of seed are then lowered toward the point of discharge in a manner such that they are substantially under control at all times. Additional groupings of seed are added adjacent the top as those which have moved downwardly to a point near the ground are discharged. The spacement of the hills determines, to a substantial extent, the speed at which we move the seed groupings downwardly. If hills are being planted very close together, the said groupings may be, at times, carried down more rapidly than gravity would pull them. On the other hand when the hills are substantial distances apart we may, intermittently entirely halt the downward movement of one or more, normally all, of the seed groupings.

When a grouping is about to be discharged, we prefer to use positive means for crowding the seeds thereof into a confined space. After the seed are so confined and preferably while the grouping is already in controlled motion with reference to the vehicle being employed in the planting operation, we give said seed grouping a rearwardly directed impetus of a speed most desirably approximately equal to that at which said vehicle is travelling. Actually, the completion of the confining phase may be accomplished during the application of the said rearwardly directed impetus but preferably it is completed before any of the seed of the grouping have escaped control.

Our process may, of course, be varied. In fact changes in it may be made in addition to elimination or alteration of one or more of the steps and/or conditions which have been indicated as preferable but not indispensible.

We have disclosed a number of means for executing our process of planting. It may, however, be carried out by much simpler means. For example, it can be executed manually by one or more individuals riding on a skeleton vehicle.

An advantage of having seed groupings at a plurality of levels between the reservoir and the ground and of lowering each of said groupings as the planting proceeds is that the seed is thus brought into close proximity to the ground before it is released, eliminating a sizable amount of free fall. When a substantial distance for free fall is present in a planting operation, it is difficult to plant several seed accurately in a hill while traveling at a relatively high field speed due, in part at least, to the delay which necessarily occurs while the seeds fall the greater distance.

It should also be pointed out that while the operation of positively closely confining the kernels of the respective groups before application of the rearward impetus may be omitted, it is a highly desirable inclusion. By it we insure that the kernels of a group are all together at the time of application of the impetus so that the effect on each is the same and they all travel together into a hill. When gravity is relied upon to group them, they often continue to bounce about due to the length of their free fall or due to the roughness of the ride of the planter vehicle.

It should be understood that it is our intention in the ensuing claims to cover all changes and modifications of the examples of our invention herein chosen for purposes of the disclosure, which do not constitute departures from the spirit and scope of the invention.

We claim:
1. Planter mechanism comprising a planter boot, an endless conveyor of the chain type, said conveyor being disposed in a generally vertical position within said boot, lip members projecting from the outer surface of said conveyor, a sprocket for propelling said conveyor in engagement with the inner surface thereof, a shaft mounting said sprocket and locked thereto, closure means cooperating with said conveyor and its lips for providing seed-tight compartments on the downward traveling run of said conveyor, a valve forming a part of the closure of one of said compartments and adapted to be successively opened by said lips, said valve being located adjacent the lower end of said conveyor, a power transmitting means operatively connected to the shaft of the conveyor propelling sprocket by a protuberance and cooperating cutout, said cutout being of a width substantially greater than that of the protuberance whereby said shaft can temporarily travel at a faster rate than said power transmitting means, means for driving said power transmitting means operatively connected thereto, a notched disk locked to said shaft of the conveyor propelling sprocket, a rotatable member mounted in operative relationship to said notched disk and adapted to travel along the outer periphery thereof in and out of the notches, and means operatively connected to said rotatable member for yieldably but firmly pressing said rotatable member against the outer periphery of the notched disk whereby independent driving of the shaft of the said conveyor propelling sprocket is provided as said rotatable member enters a notch of said notched disk and whereby, at approximately the same time, a lip of said conveyor is caused to give an extra impetus to seed which it is ejecting from said valve.

2. Seed planter mechanism for carrying hill-size seed groupings to a point near the ground and discharging each group in a constricted condition so that the component seeds will come to rest on the ground in close proximity to one another whereby the respective seeds can help one another break through crusted ground comprising a conveyor having a primary surface, means for propelling said conveyor, a plurality of protuberances projecting from the primary surface of said conveyor and dividing it into a plurality of seed carrying compartments, housing structure cooperating with at least some of said seed carrying compartments to prevent seed from becoming dislodged therefrom, and a valve swingably mounted near the discharge of said conveyor which, when in closed position, extends at least momentarily to a point on the primary surface between two of the said protuberances on said conveyor for restricting the movement of the seed of a seed grouping to cause the said seed to come close together and which is capable of being opened for the discharge of said seed while the same remain in said close relationship to one another, said valve having its extending end formed to a general hook-shape, it being the latter portion of the valve which projects to a point on the primary surface between two protuberances when said valve is closed.

3. The mechanism of claim 2 in which the conveyor is of the endless chain type and the protuberances are in the form of lips projecting from the chain.

4. The mechanism of claim 2 in which the intake end of said conveyor is provided with a shield for directing the seed into the conveyor which shield is flexible in its mounting and has on its operative surface at least one recessed area.

5. The mechanism of claim 2 in which the conveyor normally travels at a given speed but in which means is provided for accelerating its speed as discharge of a seed grouping is about to take place.

6. The mechanism of claim 2 in which a power source is provided for normally driving the conveyor through a suitable drive train including a connection which permits the conveyor to travel temporarily at a faster rate without tending to drive said power source, and in which an auxiliary power source is provided for accelerating said conveyor, said auxiliary power source comprising a generally annular member having an irregular outer periphery, a rotatable member operatively related to said generally annular member and adapted to travel along the irregular outer periphery of said generally annular member and means operatively connected to said rotatable member for yieldingly pressing said rotatable member against the irregular outer periphery of said generally annular member whereby the conveyor is driven faster than the normal drive rate when said rotatable member descends inclines on the irregular outer periphery of said generally annular member.

7. The mechanism of claim 2 in which the means for propelling said conveyor comprises a continuously driven clutch member, a clutch member operatively connected to the conveyor and electromagnetic means for at times placing said clutch members in operative engagement with each other.

8. In combination in a planter a conveyor for moving seed, a shaft for driving said conveyor, a driving member on said shaft and operatively connected thereto by a protuberance and cooperating cutout for normally driving said conveyor, said cutout being of a width substantially greater than that of the protuberance whereby said shaft can temporarily travel at a faster rate than said driving member, a generally annular member, having an irregular outer periphery, locked to said shaft, a rotatable member operatively related to said generally annular member and adapted to travel along the irregular outer periphery of said generally annular member, and means operatively connected to said rotatable member for yieldingly pressing said rotatable member against the irregular outer periphery of said generally annular member whereby the conveyor is driven faster than the normal drive rate when said rotatable member descends inclines on the irregular outer periphery of said generally annular member.

9. Seed planter mechanism for carrying hill-size seed groupings to a point near the ground and discharging each group in a constricted condition so that the component seeds will come to rest on the ground in close proximity to one another whereby the respective seeds can help one another break through crusted ground comprising an endless chain type conveyor having a primary surface, means for propelling said conveyor, a plurality of lips projecting from the primary surface of said conveyor and dividing it into a plurality of seed carrying compartments, housing structure cooperating with at least some of said seed carrying compartments to prevent seed from becoming dislodged therefrom, and a valve swingably mounted near the discharge of said conveyor which, when in closed position, extends at least momentarily to a point on the primary surface between two of the said lips on said conveyor for restricting the movement of the seed of a seed grouping to cause the said seed to come close together and which is capable of being opened for the discharge of said seed while the same remain in said close relationship to one another.

References Cited by the Examiner

UNITED STATES PATENTS

| | | | |
|---|---|---|---|
| 203,325 | 5/78 | Davies | 222—414 |
| 540,157 | 5/95 | Eisenhart | 111—59 |
| 658,348 | 9/00 | Crowley | 111—51 |
| 803,082 | 10/05 | Waterman | 222—414 |
| 1,226,515 | 5/17 | Hicks | 111—1 |
| 1,264,454 | 4/18 | Terrell | 111—34 X |
| 1,269,591 | 6/18 | Fischer | 222—350 |
| 1,287,541 | 12/18 | White | 111—38 |
| 1,751,486 | 3/30 | Lutz | 111—34 |
| 1,995,273 | 3/35 | Dohrwardt | 198—154 |

(Other references on following page)

UNITED STATES PATENTS

| | | | |
|---|---|---|---|
| 2,079,061 | 5/37 | Zuckerman | 275—1 |
| 2,107,373 | 2/38 | Edwards | 74—112 |
| 2,141,044 | 12/38 | Rassman | 111—34 |
| 2,252,374 | 8/41 | Hipple | 111—34 X |
| 2,395,350 | 2/46 | Smith | 111—52 |
| 2,477,105 | 7/49 | Wildhaber | 74—393 |
| 2,496,885 | 2/50 | Milton | 111—77 X |
| 2,514,890 | 7/50 | McLemore | 47—58 |
| 2,552,246 | 5/51 | Wilckens | 74—393 |
| 2,589,836 | 3/52 | Martin | 198—170 |
| 2,854,933 | 10/58 | Kuester | 111—34 |
| 2,864,532 | 12/58 | Gabrielsen | 221—253 X |

FOREIGN PATENTS

| | | |
|---|---|---|
| 339,047 | 9/03 | France. |
| 57,503 | 3/21 | Sweden. |
| 257,228 | 2/28 | Italy. |
| 40,911 | 10/29 | Denmark. |

ABRAHAM G. STONE, *Primary Examiner.*

A. JOSEPH GOLDBERG, T. GRAHAM CRAVER, WILLIAM A. SMITH III, *Examiners.*